(12) United States Patent
Cavarec et al.

(10) Patent No.: US 6,967,418 B2
(45) Date of Patent: *Nov. 22, 2005

(54) MAGNETIC BRAKE FOR POWERED WINDOW COVERING

(75) Inventors: Pierre-Emmanuel Cavarec, San Diego, CA (US); Winston Glenn Walker, Littleton, CO (US)

(73) Assignee: Somfy SAS, Cluses (FR)

(*) Notice: Subject to any disclaimer, the term of this patent is extended or adjusted under 35 U.S.C. 154(b) by 0 days.

This patent is subject to a terminal disclaimer.

(21) Appl. No.: 10/862,745

(22) Filed: Jun. 7, 2004

(65) Prior Publication Data
US 2005/0023915 A1    Feb. 3, 2005

Related U.S. Application Data

(63) Continuation-in-part of application No. 10/445,149, filed on May 23, 2003, now Pat. No. 6,794,778, and a continuation-in-part of application No. 10/786,351, filed on Feb. 25, 2004.

(51) Int. Cl.[7] .......................... H02K 49/10; E06B 9/32
(52) U.S. Cl. ...................... 310/77; 310/93; 310/152; 160/168.1 P; 188/267
(58) Field of Search .......................... 310/77, 92–93, 310/152, 154.1, 156.1; 160/168.1 P, DIG. 16–DIG. 17; 464/29; 192/84.3; 188/267

(56) References Cited

U.S. PATENT DOCUMENTS 2,341,440 A * 2/1944 Hammer ...................... 160/298
3,104,700 A * 9/1963 Polsky ......................... 160/298
3,352,349 A   11/1967 Hannequin ................... 160/171
3,732,447 A * 5/1973 Perhata ......................... 310/76
4,103,191 A * 7/1978 Kawamura et al. ........ 310/49 R
4,522,244 A   6/1985 Brolin ......................... 160/170
4,623,012 A   11/1986 Rude et al. .................. 160/243
5,038,087 A * 8/1991 Archer et al. ............... 318/469
5,087,845 A * 2/1992 Behrens et al. ............... 310/77
5,184,660 A   2/1993 Jelic ........................... 160/171
5,228,491 A   7/1993 Rude et al. .................. 160/171
5,444,339 A * 8/1995 Domel et al. ................. 310/17
5,467,266 A * 11/1995 Jacobs et al. ................. 700/56
5,543,672 A * 8/1996 Nishitani et al. ............. 310/77
5,848,634 A   12/1998 Will et al. ................... 160/310
6,095,223 A * 8/2000 Rossini et al. .............. 160/107
6,332,491 B1 * 12/2001 Rossini ....................... 160/107
6,714,733 B2 * 3/2004 Kobayashi .................. 396/133
6,837,295 B2 * 1/2005 Wang ......................... 160/107
6,870,338 B2   3/2005 Walker et al. ............... 318/466
6,924,615 B2   8/2005 Cavarec et al. ............. 318/466

FOREIGN PATENT DOCUMENTS

DE          3232820     *   3/1984     ............. E06B 9/10

(Continued)

*Primary Examiner*—Burton Mullins
(74) *Attorney, Agent, or Firm*—Frommer Lawrence & Haug LLP; Ronald R. Santucci

(57) ABSTRACT

Two braking magnets are attached to the housing of a motor of a motorized component such as a window covering, with one magnet north face down and the other magnet south face down. With this structure the motor is braked from turning under the weight of the window covering when deenergized, while during operation the average null value of the braking field results in minimal drag on the motor.

21 Claims, 2 Drawing Sheets

FOREIGN PATENT DOCUMENTS

| | | | | |
|---|---|---|---|---|
| DE | 29509638 U1 | 11/1996 | ........... | E05F 15/10 |
| EP | 0381643 A1 | 8/1990 | ............. | E06B 9/82 |
| JP | 29028 | 2/1983 | | |
| JP | 109484 | 6/1985 | | |
| JP | 192987 | 8/1989 | | |
| JP | 363495 | 12/1992 | | |

\* cited by examiner

MAGNETIC BRAKE FOR POWERED WINDOW COVERING

RELATED APPLICATIONS

This is a continuation-in-part of U.S. patent application Ser. No. 10/445,149, filed on May 23, 2003 now U.S. Pat. No. 6,794,778 titled "Braking System for Powered Window Covering" and co-pending U.S. patent application Ser. No. 10/786,351, filed Feb. 25, 2004 titled "Piezo-Based Encoder with Magnetic Brake for Powered Window Covering" from which priority is claimed and which are incorporated herein by reference.

FIELD OF THE INVENTION

The present invention relates generally to motorized window coverings, awnings, security screens, projection screens, and the like.

BACKGROUND OF THE INVENTION

The present assignee has provided several systems for either lowering or raising a window covering, or for moving the slats of a window covering between open and closed positions, under control of a hand-held remote or other control device. These systems include a motor that is coupled through gears to the window covering activation mechanism. When the motor is energized in response to a user command signal, the activation mechanism moves the window covering. Such assemblies are disclosed in U.S. Pat. No. 6,433,498, incorporated herein by reference.

The present assignee has also provided systems for determining the position of the window coverings based on counting motor pulses, and for braking the motor from turning when it is not energized. By knowing the position of the window coverings, features such as automatic repositioning the window covering to a preset position can be provided. The present invention likewise provides structure and methods for braking an object in the absence of power while minimizing the effects of the brake during motor operation.

In the parent application, one or more permanent magnets are disclosed that are juxtaposed with the rotor to generate a magnetic field which interferes with the rotor slots and thereby creates an extra reluctance torque on the motor shaft. The extra reluctance torque establishes a static brake, to hold the rotor from undesirably turning under the weight of the window covering when the motor is deenergized.

While effective, the present invention recognizes that even though the braking field does not unduly affect motor operation when the motor is energized, it is possible to even further reduce brake drag on the motor when it is operating.

SUMMARY OF THE INVENTION

A powered assembly includes an object that can be moved between a first configuration and a second configuration. The object may be selected from the group consisting of window coverings, awnings, skylight coverings, curtains, and screens. A motor is provided, and an actuator is coupled to the motor and the object to move the object when the motor is energized. First and second magnets are juxtaposed with the rotating member and are magnetically coupled thereto. The first magnet is oriented with its north pole toward the rotating member and the second magnet is oriented with its south pole toward the rotating member.

The magnets can be disk-shaped and can be mounted on a housing of the motor side by side each other on the housing. DC batteries can be the sole source of power for the motor. Or, the braking magnets may be parallelepiped shaped. Shallow recesses may be formed in the housing of the motor in which the braking magnets can be disposed to shorten the distance between the magnets and the motor core and, hence, strengthen the braking power of the magnets. In addition, a concentrator bar can be placed over the top of the braking magnets to close the magnetic field outside the motor and, hence, to concentrate the braking field within the motor.

In another aspect, a drive assembly for a movable object including a rod includes an electrically-powered drive structure couplable to the rod to move the object when the drive structure is energized. The drive structure has a rotating member. First and second braking magnets are closely spaced from the rotating member and are oriented with the north pole of the first magnet being substantially co-planar with the south pole of the second magnet.

In still another aspect, a method for operating an object that can be moved between a first configuration and a second configuration, with the object being selected from the group consisting of window coverings, awnings, skylight coverings, curtains, and screens, includes providing a drive structure and coupling the drive structure to the object such that the object is moved when the drive structure is energized. The method also includes closely juxtaposing at least first and second magnets with the drive structure. Using the magnets, the drive structure is braked when the drive structure is not energized. On the other hand, the magnets are oriented such that when the drive structure is energized, the average magnetic field within the drive structure is at a null. That is, when the motor is energized, little or no back electromotive force (emf) is created because the effect of the field created by the braking magnets on the rotor during operation has a null average value.

The details of the present invention, both as to its construction and operation, can best be understood in reference to the accompanying drawings, in which like numerals refer to like parts, and which:

DETAILED DESCRIPTION OF THE PREFERRED EMBODIMENT

Figure 1:
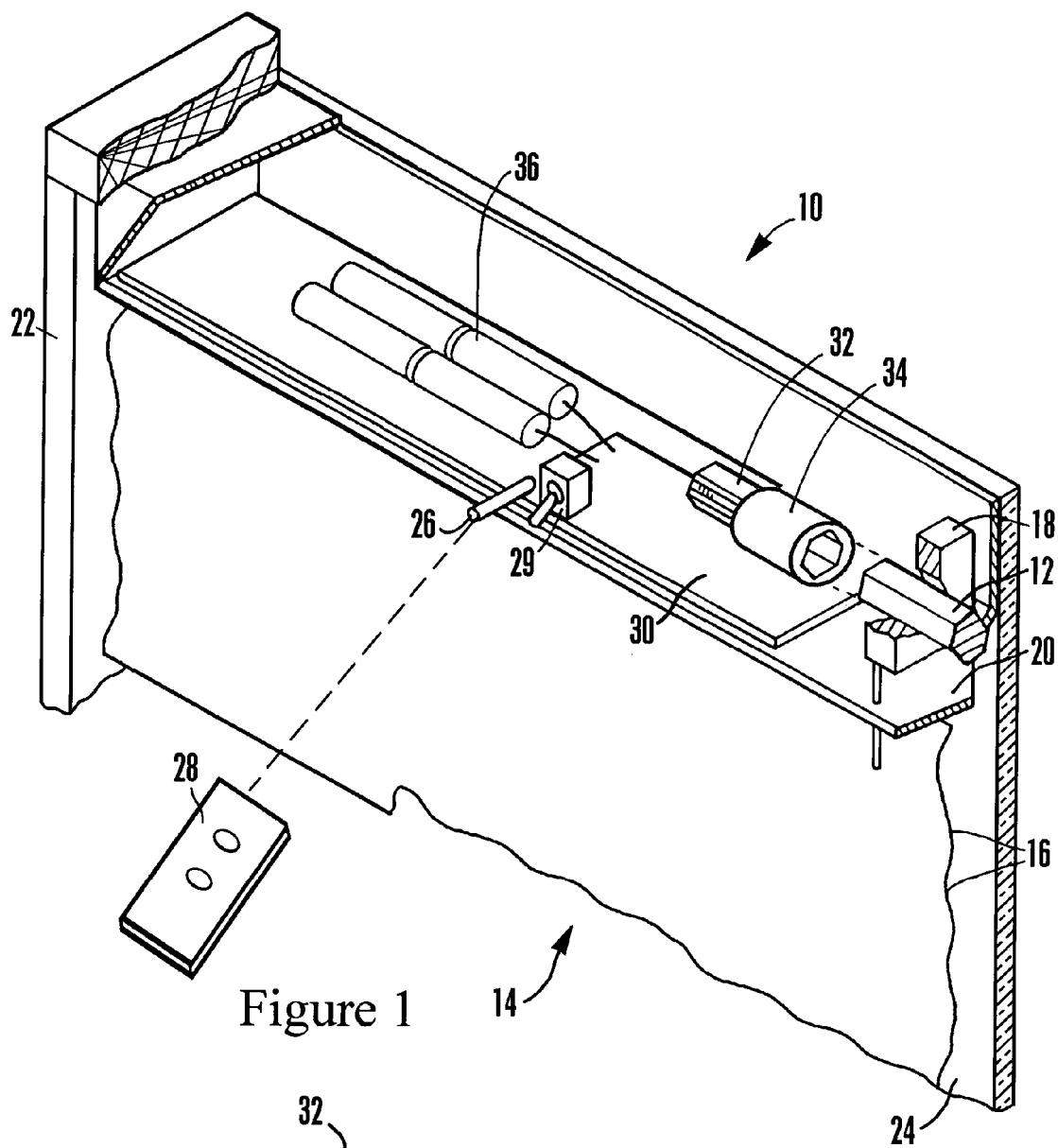
FIG. 1 is a perspective view of a window covering actuator, shown in one intended environment, with portions of the head rail cut away.

Referring initially to FIG. 1, a motorized window covering is shown, generally designated 10, that includes an actuator such as a rotatable rod 12 of a window covering 14, such as but not limited to a shade assembly having raisable (by rolling up) and lowerable (by rolling down, or unrolling)

shade 16. As shown, the tilt rod 12 is rotatably mounted by means of a block 18 in a head rail 20 of the window covering 14.

While a roll-up shade is shown, it is to be understood that the principles herein apply to a wide range of window coverings and other objects that are to be moved by motors. For example, the invention applies to raisable and lowerable pleated shades and cellular shades such as those commonly marketed under the trade names "Silhouette", "Shangri-La", etc. as well as to projector screens, awnings, etc. that can be raised and lowered. Moreover, while needed less in applications that require only tilting slats such as in horizontal blinds, the invention may also apply to these systems. Thus, for example, the rod 12 may be a roll-up rod of a shade, awning, or projector screen, or a tilt rod of a horizontal (or vertical) blind, or other like operator. It is thus to be further understood that the principles of the present invention apply to a wide range of window coverings and other objects including, but not limited to the following: vertical blinds, fold-up pleated shades, roll-up shades, cellular shades, skylight covers, etc. Powered versions of such shades are disclosed in U.S. Pat. No. 6,433,498, incorporated herein by reference.

In the non-limiting illustrative embodiment shown, the window covering 14 is mounted on a window frame 22 to cover a window 24, and the rod 12 is rotatable about its longitudinal axis. The rod 12 can engage a user-manipulable baton (not shown). When the rod 12 is rotated about its longitudinal axis, the shade 16 raises or lowers between an open configuration and a closed configuration.

FIG. 1 shows that the actuator 10 can include a control signal generator, preferably a signal sensor 26, for receiving a user command signal. Preferably, the user command signal is generated by a hand-held user command signal generator 28, which can be an infrared (IR) remote-control unit or a radio frequency (RF) remote-control unit. Or, the user command signal may be generated by any other means of communication well known in the art, such as by manipulable manual switches 29. The user command signals can include open, close, raise, lower, and so on.

An electronic circuit board 30 can be positioned in the head rail 20 and can be fastened to the head rail 20, e.g., by screws (not shown) or other well-known method. The preferred electronic circuit board 30 includes a microprocessor for processing the control signals.

FIG. 1 shows that a small, lightweight electric motor 32 is coupled to a gear enclosure 34, preferably by bolting the motor 32 to the gear enclosure 34. The gear enclosure 34 is keyed to the rod 12, so that as the gears in the gear enclosure 34 turn, the rod 12 rotates.

It is to be understood that the motor 32 is electrically connected to the circuit board 30. To power the motor 32, one or more (four shown in FIG. 1) primary dc batteries 36, such as type AA alkaline batteries or Lithium batteries, can be mounted in the head rail 20 and connected to the circuit board 30. Preferably, the batteries 36 are the sole source of power for the motor, although the present invention can also be applied to powered shades and other objects that are energized from the public ac power grid.

As set forth in the above-referenced U.S. Patent, a user can manipulate the signal generator 28 to generate a signal that is sensed by the signal sensor 26 and sent to signal processing circuitry in the circuit board 30. In turn, the electrical path between the batteries 34 and the motor 32 is closed to energize the motor 32 and move the window covering open or closed in accordance with the signal generated by the signal generator 28, under control of the processor on the electronic circuit board 30. When the motor is deenergized, the braking magnets disclosed below advantageously brake the motor from turning under the weight of the window covering 14.

Figure 2:
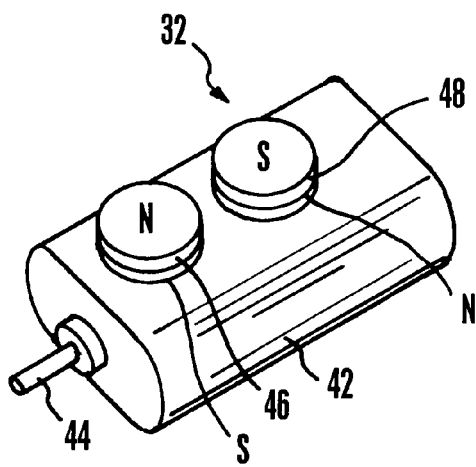
FIG. 2 is a perspective view of a first embodiment of the motor showing disk-shaped braking magnets.

Now referring to FIG. 2, in one non-limiting implementation the motor 32 includes a motor housing 42 inside of which a rotor 44 may rotate. The rotor 44 may have, e.g., three poles. First and second permanent braking magnets 46, 48 are closely juxtaposed with the motor. The non-limiting magnets are disk-shaped with opposing magnetic poles for each magnet being established by the flat faces of the disk. Preferably, the magnets 46, 48 are attached to the housing 42 on a flat portion thereof by, e.g., solvent bonding the magnets to the housing 42, with the magnets being positioned side by side each other.

In accordance with present principles, the first magnet 46 is oriented with its south pole "S" against the housing 42 and, hence, facing the rotor 44, while the second magnet 48 is oriented with its north pole "N" against the housing 42. Stated differently, the north pole "N" of the magnet 48 is substantially co-planar with the south pole "S" of the magnet 46.

With this structure, the magnets 46, 48 are magnetically coupled to the rotor 44 sufficiently to stop it from rotating when the motor 32 is deenergized. However, when the motor 32 is energized, the average magnetic field effect on the rotor generated by the magnets 46, 48 is at a null, thereby causing little or no drag on the rotor 44 as it rotates.

Figure 3:
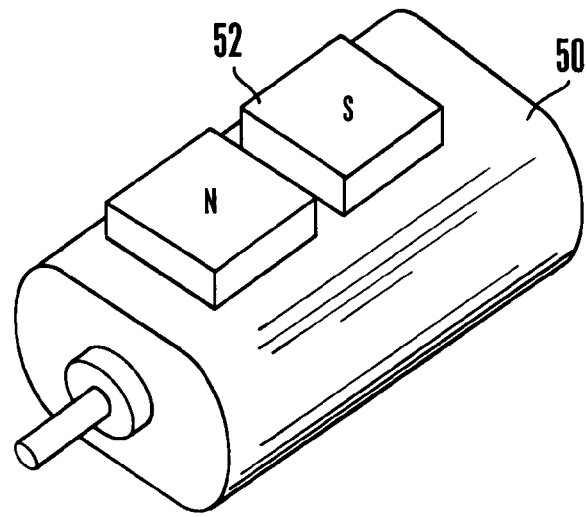
FIG. 3 is a perspective view of a second embodiment of the motor showing parallelepiped shaped braking magnets.

FIG. 3 shows an alternate embodiment having a motor 50 on which is mounted braking magnets 52 with opposed polarities as shown. The braking magnets 52 shown in FIG. 3 can be parallelepiped shaped.

Figure 4:
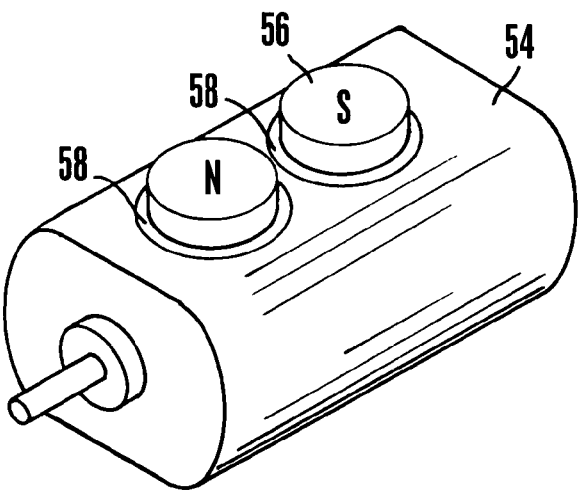
FIG. 4 is a perspective view of a third embodiment of the motor showing braking magnets in shallow recesses that have been formed in the housing of the motor.

FIG. 4 shows another alternate embodiment having a motor 54 on which is mounted braking magnets 56 with opposed polarities as shown. The braking magnets 56 shown in FIG. 4 can be disk shaped as shown or they can have other shapes (e.g., they can be parallelepiped shaped.) In any case, shallow recesses 58 that are preferably configured to match the contours of the braking magnets 56 are formed in the housing of the motor (but not through the case). With this structure, the distance between the magnets 56 and the core of the motor is shortened and, hence, the braking force of the magnets on the motor strengthened.

Figure 5:
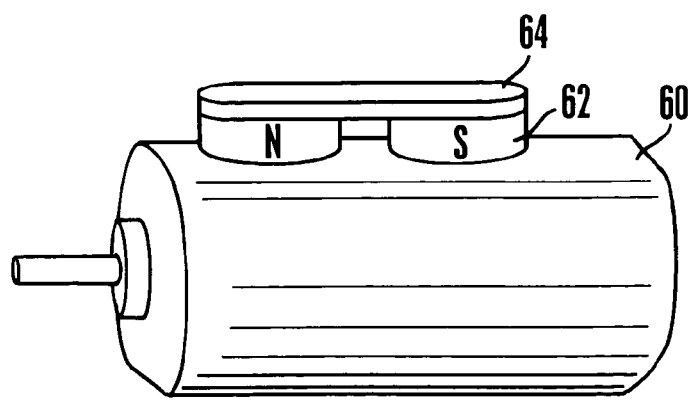
FIG. 5 is a perspective view of a fourth embodiment of the motor showing braking magnets and a magnetic concentrator.

FIG. 5 shows yet another alternate embodiment having a motor 60 on which is mounted braking magnets 62 with opposed polarities as shown. The braking magnets 62 shown in FIG. 5 can be disk shaped as shown or they can have other shapes (e.g., they can be parallelepiped shaped.) In any case, a magnetic concentrator 64, such as an elongated ferromagnetic bar, can be placed on top of the braking magnets 62 to sandwich the magnets 62 between the concentrator 64 and motor 60 and thereby close the magnetic field beyond the braking magnets opposite the motor 60. This serves to strengthen the magnetic braking field inside the motor, permitting the use of smaller magnets if desired. The concentrator 64 can have rounded ends as shown to match the contours of the braking magnets 62 in the event that the braking magnets 62 are disk shaped. The length of the non-limiting concentrator can equal the diameters of the braking magnets plus the distance between the braking magnets as shown.

While the particular MAGNETIC BRAKE FOR POWERED WINDOW COVERING as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A powered assembly, comprising:
   at least one object that can be moved between a first configuration and a second configuration, the object being selected from the group consisting of window coverings, awnings, skylight coverings, curtains, and screens;
   at least one motor defining at least part of a rotating member;
   at least one actuator coupled to the motor and the object to move the object when the motor is energized; and
   at least first and second magnets juxtaposed with the rotating member and magnetically coupled thereto, the first magnet being oriented with its north pole toward the rotating member and the second magnet being oriented with its south pole toward the rotating member, wherein the magnets are disk-shaped.

2. The powered assembly of claim 1, wherein the motor is powered by at least one dc battery.

3. The powered assembly of claim 1, wherein the rotating member includes a rotor of the motor.

4. A powered assembly, comprising:
   at least one object that can be moved between a first configuration and a second configuration, the object being selected from the group consisting of window coverings, awnings, skylight coverings, curtains, and screens;
   at least one motor;
   at least one actuator coupled to the motor and the object to move the object when the motor, is energized; and
   at least first and second magnets magnetically coupled to a rotating member moved when the motor is energized, the first magnet being oriented with its north pole toward the rotating member and the second magnet being oriented with its south pole toward the rotating member, wherein the magnets are mounted on a housing of the motor.

5. The powered assembly of claim 4, wherein the magnets are positioned side by side each other on the housing of the motor.

6. A powered assembly, comprising:
   at least one object that can be moved between a first configuration and a second configuration, the object being selected from the group consisting of window coverings, awnings, skylight coverings, curtains, and screens;
   at least one motor defining at least part of a rotating member;
   at least one actuator coupled to the motor and the object to move the object when the motor is energized; and
   at least first and second magnets juxtaposed with the rotating member and magnetically coupled thereto, the first magnet being oriented with its north pole toward the rotating member and the second magnet being oriented with its south pole toward the rotating member, wherein the magnets are parallelepiped shaped.

7. A powered assembly, comprising:
   at least one object that can be moved between a first configuration and a second configuration, the object being selected from the group consisting of window coverings, awnings, skylight coverings, curtains, and screens;
   at least one motor defining at least part of a rotating member;
   at least one actuator coupled to the motor and the object to move the object when the motor is energized; and
   at least first and second magnets juxtaposed with the rotating member and magnetically coupled thereto, the first magnet being oriented with its north pole toward the rotating member and the second magnet being oriented with its south pole toward the rotating member, wherein the motor includes a motor housing and plural shallow recesses are formed in the housing without extending completely therethrough, the magnets being disposed in the recesses.

8. A powered assembly, comprising:
   at least one object that can be moved between a first configuration and a second configuration, the object being selected from the group consisting of window coverings, awnings, skylight coverings, curtains, and screens;
   at least one motor defining at least part of a rotating member;
   at least one actuator coupled to the motor and the object to move the object when the motor is energized; and
   at least first and second magnets juxtaposed with the rotating member and magnetically coupled thereto, the first magnet being oriented with its north pole toward the rotating member and the second magnet being oriented with its south pole toward the rotating member, comprising a magnetic field concentrator, the magnets being sandwiched between the concentrator and motor.

9. A drive assembly for a movable object including a rod, comprising:
   an electrically-powered drive structure couplable to the rod to move the object when the drive structure is energized, the drive structure having a rotating member; and
   at least first and second braking magnets closely spaced from the rotating member and oriented with the north pole of the first magnet being substantially co-planar with the south pole of the second magnet, wherein the magnets are mounted on a housing of the rotating member.

10. The assembly of claim 9, wherein the drive structure is powered by at least one dc battery.

11. The assembly of claim 10, wherein the object is selected from the group consisting of window coverings, awnings, skylight coverings, curtains, and screens.

12. The assembly of claim 9, wherein the magnets are magnetically coupled to the rotating member sufficiently to stop the rotating member from rotating when the drive structure is deenergized.

13. The drive assembly of claim 9, wherein the magnets are positioned side by side each other on the housing of the motor.

14. The assembly of claim 9, wherein plural shallow recesses are formed in the housing of the motor without extending completely therethrough, the magnets being disposed in the recesses.

15. A drive assembly for a movable object including a rod, comprising:
   an electrically-powered drive structure couplable to the rod to move the object when the drive structures is energized, the drive structure having a rotating member; and
   at least first and second braking magnets closely spaced from the rotating member and oriented with the north pole of the first magnet being substantially co-planar with the south pole of the second magnet, wherein the magnets are disk-shaped or parallelepiped shaped.

16. A drive assembly for a movable object including a rod, comprising:
   an electrically-powered drive structure couplable to the rod to move the object when the drive structure is energized, the drive structure having a rotating member; and
   at least first and second braking magnets closely spaced from the rotating member and oriented with the north pole of the first magnet being substantially co-planar with the south pole of the second magnet, further comprising a magnetic field concentrator, the magnets being sandwiched between the concentrator and motor.

17. A method for operating an object that can be moved between a first configuration and a second configuration, the object being selected from the group consisting of window coverings, awnings, skylight coverings, curtains, and screens, the method comprising:
   providing a drive structure;
   coupling the drive structure to the object such that the object is moved when the drive structure is energized;
   closely juxtaposing at least first and second magnets with the drive structure on a housing thereof; and
   using the magnets to brake the drive structure when the drive structure is not energized.

18. The method of claim 17, comprising powering the object solely by means of at least one primary dc battery.

19. The method of claim 17, comprising orienting the magnets with one north pole facing the drive structure and the other north pole facing away from the drive structure.

20. A method for operating an object that can be moved between a first configuration and a second configuration, the object being selected from the group consisting of window coverings, awnings, skylight coverings, curtains, and screens, the method comprising:
   providing a drive structure;
   coupling the drive structure to the object such that the object is moved when the drive structure is energized;
   closely juxtaposing at least first and second magnets whit the drive structure a housing thereof;
   using the magnets to brake the drive structure when the drive structure is not energized; and
   forming shallow recesses in the housing of the motor without extending completely therethrough, the magnets being disposed in the recesses.

21. A method for operating an object that can be moved between a first configuration and a second configuration, the object being selected from the group consisting of window coverings, awnings, skylight coverings, curtains, and screens, the method comprising:
   providing a drive structure;
   coupling the drive structure to the object such that the object is moved when the drive structure is energized;
   closely juxtaposing at least first and second magnets with the drive structure on a housing thereof;
   using the magnets to brake the drive structure when the drive structure is not energized; and disposing a magnetic field concentrator on the magnets.

* * * * *